(12) United States Patent
Doi

(10) Patent No.: US 9,244,849 B2
(45) Date of Patent: Jan. 26, 2016

(54) STORAGE CONTROL APPARATUS, STORAGE SYSTEM AND METHOD

(75) Inventor: Koichi Doi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1130 days.

(21) Appl. No.: 13/163,816

(22) Filed: Jun. 20, 2011

(65) Prior Publication Data

US 2011/0320717 A1    Dec. 29, 2011

(30) Foreign Application Priority Data

Jun. 24, 2010  (JP) ................................ 2010-144306

(51) Int. Cl.
*G06F 13/00*    (2006.01)
*G06F 12/08*    (2006.01)

(52) U.S. Cl.
CPC ................................ *G06F 12/0873* (2013.01)

(58) Field of Classification Search
CPC ........... G06F 13/00; G06F 7/00; G06F 17/00; G06F 17/30; G06F 12/16
See application file for complete search history.

(56) References Cited

U.S. PATENT DOCUMENTS

| | | | | |
|---|---|---|---|---|
| 8,260,750 | B1 * | 9/2012 | Gugick et al. | 707/645 |
| 2001/0049776 | A1 * | 12/2001 | Maeda | 711/162 |
| 2002/0161980 | A1 * | 10/2002 | Nishikawa | 711/162 |
| 2005/0086443 | A1 | 4/2005 | Mizuno et al. | |
| 2005/0177767 | A1 | 8/2005 | Furuya et al. | |
| 2006/0101200 | A1 * | 5/2006 | Doi | 711/113 |
| 2009/0193064 | A1 * | 7/2009 | Chen et al. | 707/204 |

FOREIGN PATENT DOCUMENTS

| | | |
|---|---|---|
| JP | 2005-122611 | 5/2005 |
| JP | 2005-190139 | 7/2005 |

* cited by examiner

*Primary Examiner* — Charles Rones
*Assistant Examiner* — Han Doan
(74) *Attorney, Agent, or Firm* — Staas & Halsey LLP

(57) ABSTRACT

A storage control apparatus includes a memory configured to store access management information concerning access from a host to each of a plurality of logical volumes, and a controller configured to refer to the access management information read from the memory, when receiving an entirety of updated data from the host, to set a write mode for data transfer from each of the plurality of logical volumes to the corresponding physical volume on the basis of the access management information to one of a difference data write mode in which difference data indicating a difference between an entirety of data stored in a storage apparatus and the entirety of updated data is written into a storage apparatus and an entire data write mode in which the entirety of updated data is written into the storage apparatus.

10 Claims, 20 Drawing Sheets

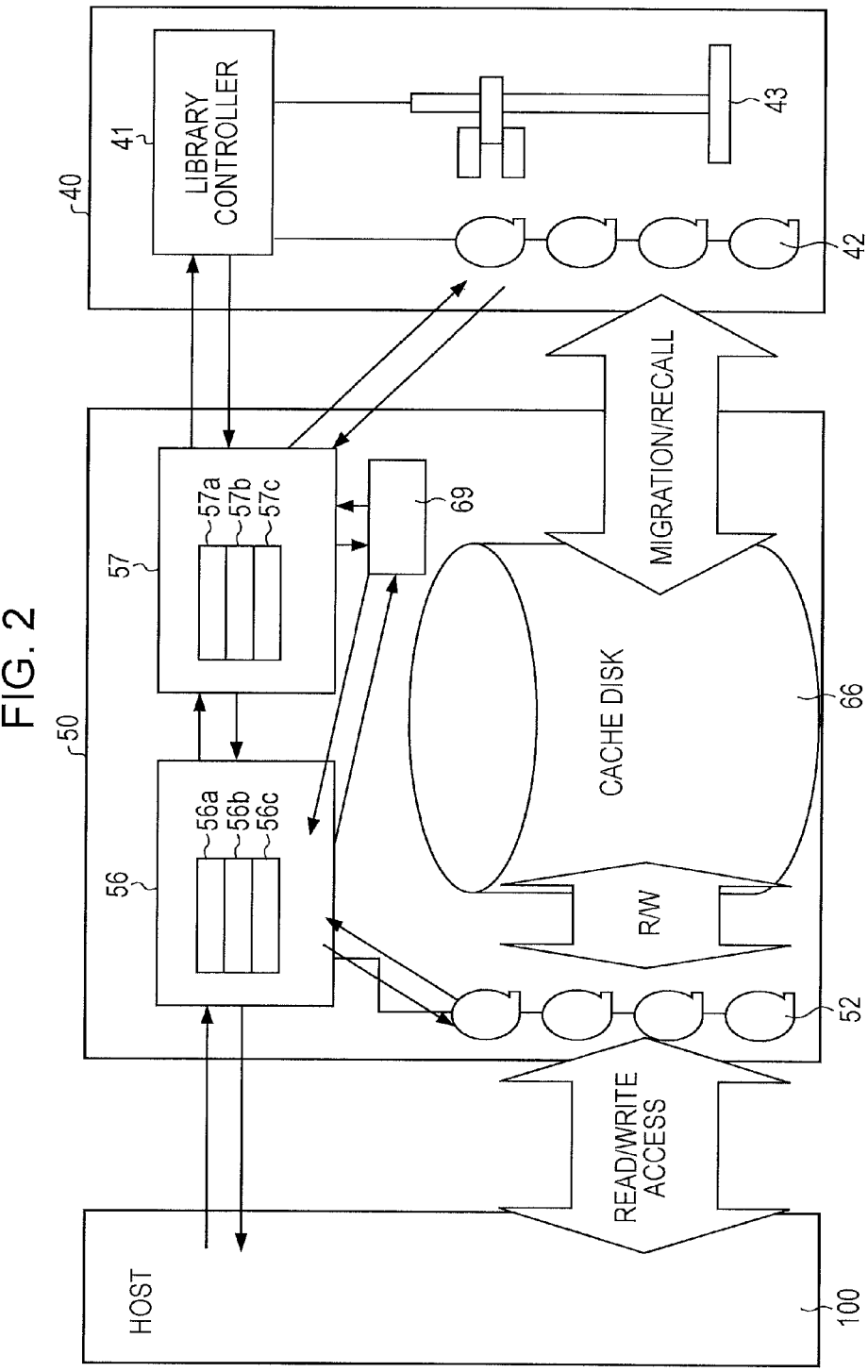

FIG. 4A

| |
|---|
| VOLUME NAME |
| GENERATION TIME STAMP |
| ACCESS TIME STAMP |
| GENERATION NUMBER |
| DATA SIZE |
| NUMBER OF BLOCKS |

FIG. 4B

| |
|---|
| BLOCK ID |
| BLOCK TYPE |
| COMPRESSION FLAG |
| DATA SIZE |
| GENERATION NUMBER |

FIG. 4C

| |
|---|
| POSITION OFFSET OF PREVIOUS BLOCK MANAGEMENT TABLE GROUP |
| BLOCK MANAGEMENT TABLE OF BLOCK ID 1 |
| ⋮ |
| BLOCK MANAGEMENT TABLE OF BLOCK ID N |
| POSITION OFFSET OF SUBSEQUENT BLOCK MANAGEMENT TABLE GROUP |

| BLOCK ID | BLOCK TYPE | COMPRESSION FLAG | DATA SIZE | GENERATION NUMBER |
|---|---|---|---|---|
| 1 | DATA | COMPRESSED | Aa | X |
| 2 | DATA | COMPRESSED | Ab | X |
| : | : | : | : | |
| M | DATA | COMPRESSED | Am | X |
| M+1 | DATA | COMPRESSED | Am+1 | X+1 |
| : | : | : | : | |
| 2N+1 | DATA | COMPRESSED | A2n+1 | X+1 |

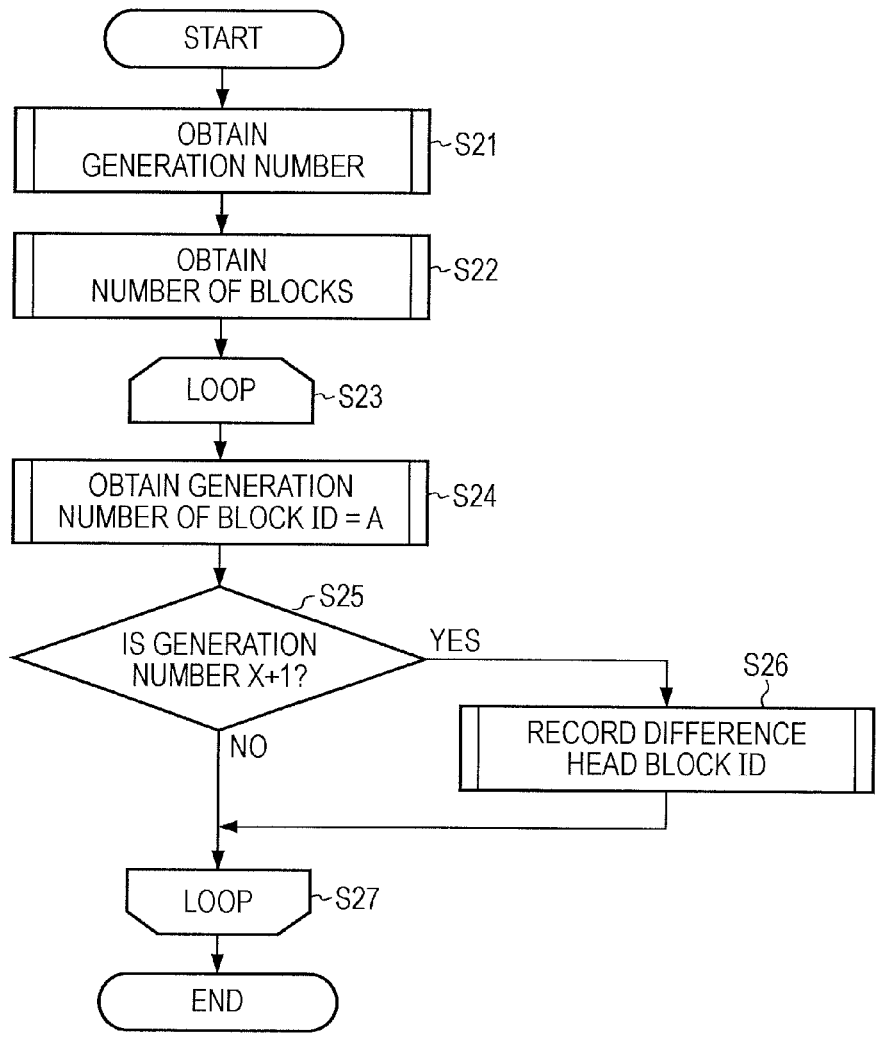

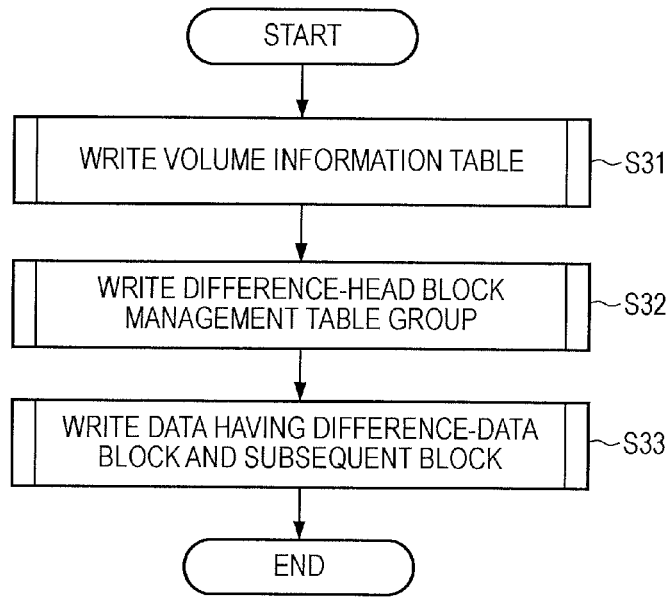
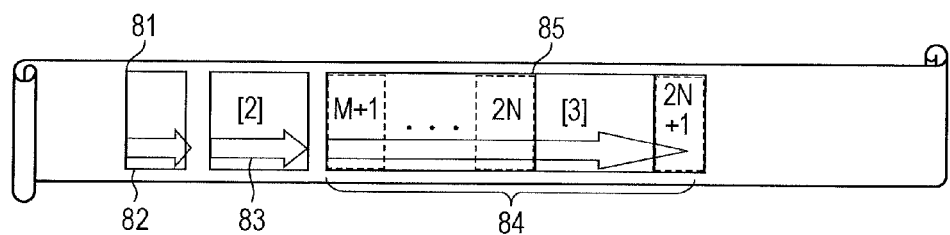

FIG. 12A
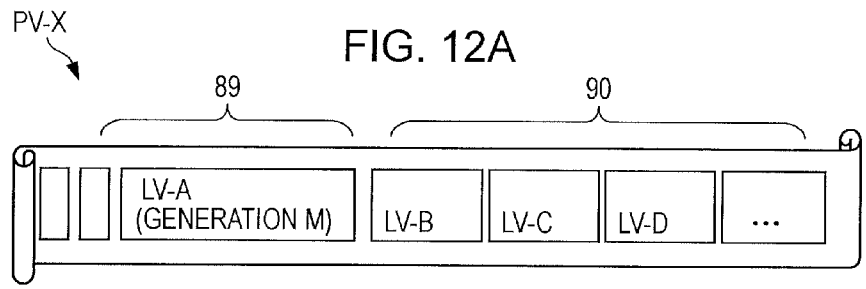
FIG. 12B
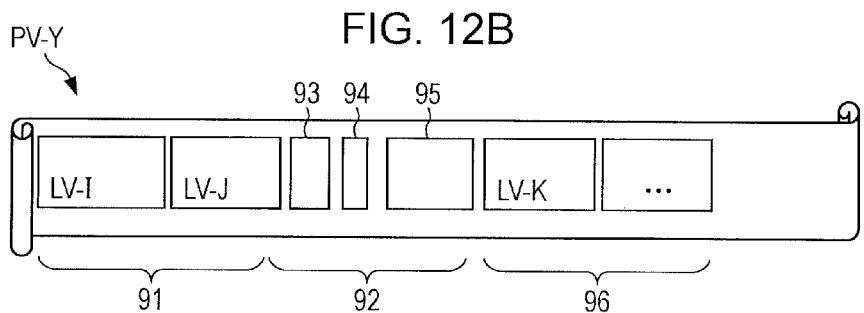
FIG. 13
| PHYSICAL VOLUME NAME | PV-X | PV-Y |
|---|---|---|
| LOGICAL VOLUME NAME | LV-A | LV-A |
| HEAD BLOCK ID | Bbb | Aaa |
| DIFFERENCE FLAG | 0 (ENTIRETY) | 1 (DIFFERENCE) |
| GENERATION NUMBER | M | M+1 |
| DATA SIZE 1 | AAm | AAm+1 |
| DATA SIZE 2 | BBm | BBm+1 |
| LV BLOCK ID | 1 | 4 |
| NUMBER OF LV BLOCKS | 3 | 2 |
| WRITE DATE | 20100101 | 20100101 |
| VALIDITY FLAG | 1 (VALID) | 1 (VALID) |

FIG. 15

| INDEX | PHYSICAL VOLUME NAME | GENERATION NUMBER | DATA SIZE 1 | DATA SIZE 2 | LV BLOCK ID | NUMBER OF LV BLOCKS |
|---|---|---|---|---|---|---|
| 1 | PV-X | M | AAm | BBm | 1 | 3 |
| 2 | PV-Y | M+1 | AAm+1 | BBm+1 | 4 | 2 |

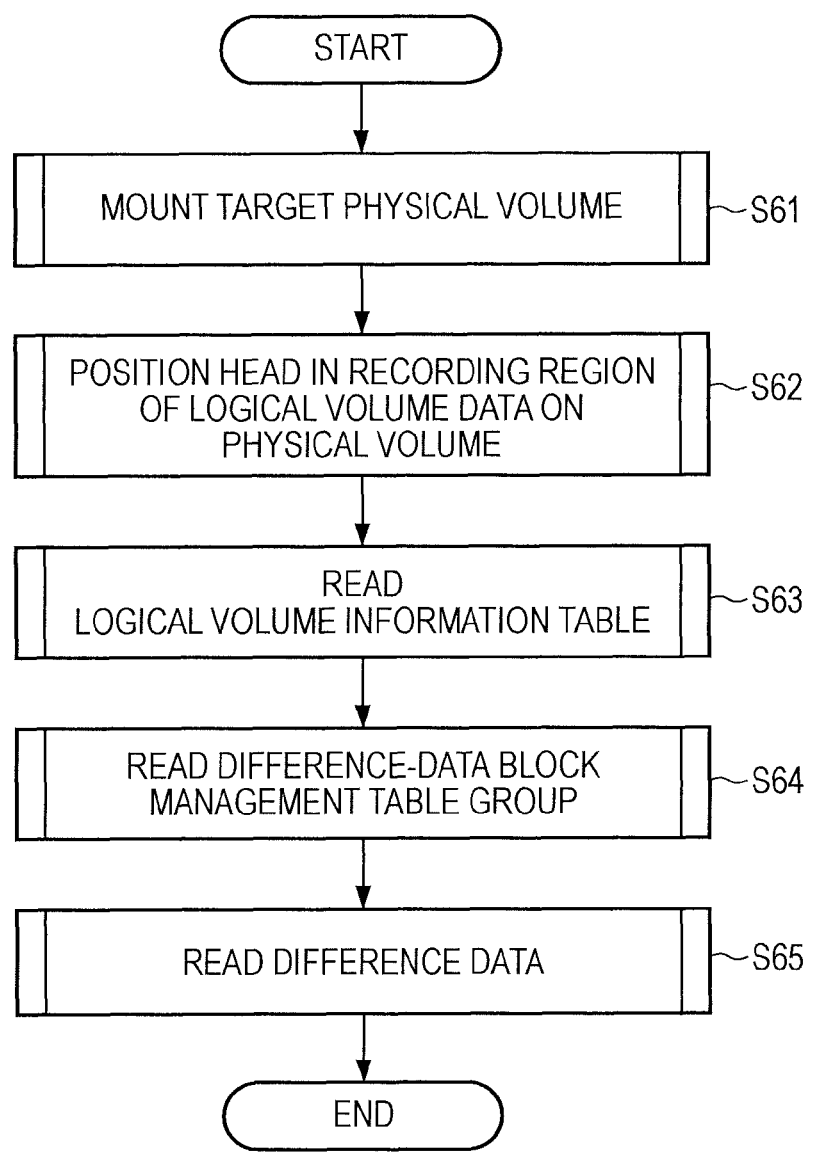

FIG. 19A

| LOGICAL VOLUME NAME | LV-A | LV-B | ... | LV-AA | LV-AB | ... | LV-JJ | LV-JK | ... | LV-MN |
|---|---|---|---|---|---|---|---|---|---|---|
| ACCESS FREQUENCY (ONE WEEK) | 3 | 3 | ... | 1 | 0 | ... | 0 | 0 | ... | 0 |
| ACCESS FREQUENCY (ONE MONTH) | 12 | 10 | ... | 5 | 2 | ... | 1 | 1 | ... | 0 |
| ACCESS FREQUENCY (THREE MONTHS) | 20 | 20 | ... | 10 | 5 | ... | 3 | 3 | ... | 0 |
| DATA AMOUNT | X0 | X1 | ... | X3 | X4 | ... | X6 | X7 | ... | X9 |
| MODE DIFFERENCE (0) ENTIRETY (1) | 0 | 0 | ... | 0 | 0 | ... | 0 | 0 | ... | 0 |

FIG. 19B

| LOGICAL VOLUME NAME | LV-A | LV-B | ... | LV-AA | LV-AB | ... | LV-JJ | LV-JK | ... | LV-MN |
|---|---|---|---|---|---|---|---|---|---|---|
| ACCESS FREQUENCY (ONE WEEK) | 3 | 3 | ... | 1 | 0 | ... | 0 | 0 | ... | 0 |
| ACCESS FREQUENCY (ONE MONTH) | 12 | 10 | ... | 5 | 2 | ... | 1 | 1 | ... | 0 |
| ACCESS FREQUENCY (THREE MONTHS) | 20 | 20 | ... | 10 | 5 | ... | 3 | 3 | ... | 0 |
| DATA AMOUNT | X0 | X1 | ... | X3 | X4 | ... | X6 | X7 | ... | X9 |
| MODE DIFFERENCE (0) ENTIRETY (1) | 0 | 0 | ... | 1 | 1 | ... | 1 | 1 | ... | 1 |

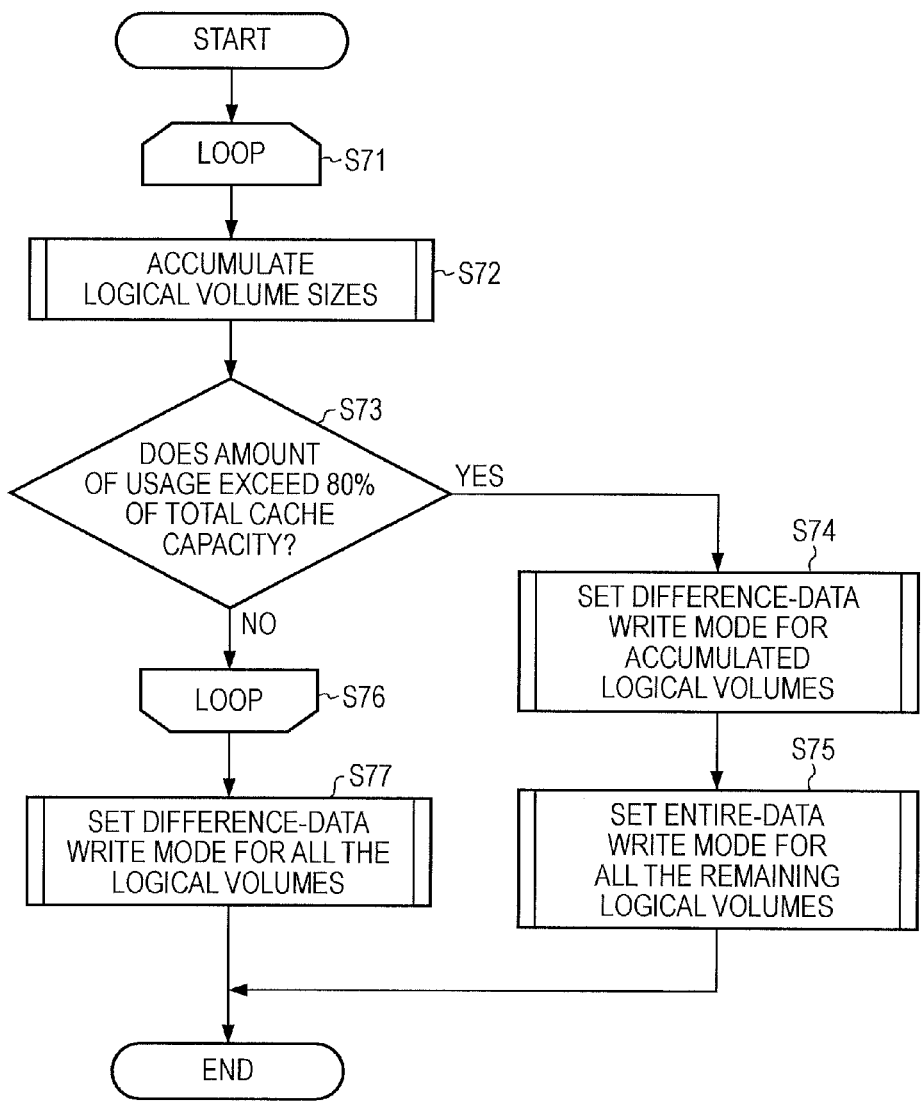

STORAGE CONTROL APPARATUS, STORAGE SYSTEM AND METHOD

CROSS-REFERENCE TO RELATED APPLICATION

This application is based upon and claims the benefit of priority of the prior Japanese Patent Application No. 2010-144306, filed on Jun. 24, 2010, the entire contents of which are incorporated herein by reference.

FIELD

The embodiments discussed herein are related to a storage control apparatus, a storage system and a storage control method.

BACKGROUND

FIG. 21 is a conceptual drawing illustrating a storage system using a library apparatus as a storage apparatus. In a general storage system, a host (host computer) 1 is directly connected to a real library apparatus 2. Accordingly, the host 1 controls a transfer mechanism 3 to mount/unmount physical volumes 4 onto/from physical drives 5. The host 1 then reads/writes data from/into the physical volumes 4 mounted on the physical drives 5.

FIG. 22 is a conceptual drawing illustrating a storage system using a virtual library apparatus 11. The virtual library apparatus 11 is disposed between a host 10 and a real library apparatus 12 and provides logical drives 13 and logical volumes 14 to the host 10. The real library apparatus 12 is, for example, a tape library apparatus, and each of physical volumes 17 is assigned with, for example, each tape housed in tape cartridge. The logical drives 13 are, for example, a cache disk 16, and each of the logical volumes 14 is assigned with, for example, each of a plurality of recording regions of the cache disk 16.

Although the host 10 is directly connected to the virtual library apparatus 11, the host 10 may treat the real library apparatus 12 as equivalent to the real library apparatus directly connected to the host 10. Accordingly, as in the storage system illustrated in FIG. 21, the host 10 is able to access the logical volumes 14 via the logical drives 13 within the virtual library apparatus 11 without being aware of the presence of the virtual library apparatus 11.

A controller 15 provided for the virtual library apparatus 11 stores data (logical volume data) to be recorded on recording regions of the cache disk 16 corresponding to the logical volumes 14. The cache disk 16 is disposed within the virtual library apparatus 11. Then, the controller 15 transfers data from the cache disk 16 to the physical drives 18 disposed within the real library apparatus 12 by performing migration processing asynchronously with access from the host 10.

The logical volume data stored in tapes corresponding to the physical volumes 17 within the real library apparatus 12 are transferred to the cache disk 16 and are stored therein as far as the storage capacity of the cache disk 16 permits. Accordingly, in response to a request from the host 10 to access the same logical volume 14 once again as that storing the data before, it is possible to promptly return a ready state response.

In contrast, if there is a shortage of the storage capacity of the cache disk 16, the controller 15 drives out the logical volume data stored in the cache disk 16 and transfers the driven data to a tape corresponding to a physical volume 17, by performing migration processing. This is performed on the basis of logic by considering, for example, the frequency of the usage of the logical volumes 14. With this operation, the storage capacity of the cache disk 16 for storing other logical volume data may be reserved in the cache disk 16.

The logical volume data driven out of the cache disk 16 of the virtual library apparatus 11 is transferred to the real library apparatus 12 by migration processing. Then, the real library apparatus 12 controls a transport mechanism 19 and a physical drive 18 to write the logical volume data into a tape corresponding to a physical volume 17.

If there is a request from the host 10 to mount the logical volume data on a logical drive 13, the logical volume data is read from the tape. Then, the read logical volume data is stored in recording regions of the cache disk 16 corresponding to the logical volumes 14 (RECALL processing). To complete such RECALL processing, it takes several tens of seconds to several minutes from a time at which the host 10 makes a request to mount the logical volume data until a time at which the mounting operation is finished.

FIG. 23A through FIG. 23C are conceptual drawings illustrating the state in which logical volume data is written in a recording region of a cache disk corresponding to a logical volume. A description is given below, assuming that a tape library apparatus is used as a backend by way of example.

In the virtual library apparatus 11, tape drives do not exist. However, from a viewpoint of the host 10, it appears as if there were tape drives in the virtual library apparatus 11. Thus, access from the host 10 to the logical drives 13 is the same as that to tape drives.

In a tape drive, data may be written into a tape while the tape is being transferred, which implements the sequential writing of data, thereby achieving fast access. However, because of the structure of media (tape), it is not possible to partially overwrite data stored in the tape.

FIG. 23A illustrates logical volume data stored in a recording region of a cache disk corresponding to a logical volume. Updating of the logical volume data having block ID 1 through block ID 3 stored in a recording region 941 may be performed by either of the incremental (additional) write system or the overwrite system.

In the incremental write system illustrated in FIG. 23B, additional new logical volume data 4 and 5 are written into a recording region 942 positioned after the recording region 941 in which the logical volume data 1 through 3 are stored. In the overwrite system illustrated in FIG. 23C, overwriting of data is started from the head (data having block ID 1) of the logical volume, and the entirety of the data including updated data, i.e., the updated logical volume data having block ID 1 through block ID 3, which is a series of the data reflecting the updated content, is written into a recording region 943.

FIG. 24A and FIG. 24B are conceptual drawings illustrating the state in which data is written in a tape corresponding to a physical volume. In updating processing on stored data, because of the structure of a tape, as described above, partial overwriting of data stored in the tape is not possible. Accordingly, the conceptual drawings of the physical volume illustrated in FIG. 24A and FIG. 24B are different from those of the logical volume illustrated in FIG. 23B and FIG. 23C.

More specifically, in the incremental write system, as illustrated in FIG. 24A, after a recording region 950 in which logical volume data having block ID 1 through block ID 3 are stored, updated logical volume data including the stored logical volume data having block ID 1 through block ID 3 and additional data having block ID 4 and block ID 5 is written into a recording region 951. Accordingly, in the incremental write system, the same data having block ID 1 through block ID 3 are recorded on the tape plural times, which demands an extra storage capacity.

In the overwrite system, as illustrated in FIG. 24B, updated logical volume data having block ID 1 through block ID 3 are written into a recording region 953 positioned after a recording region 952 in which existing logical volume data having block ID 1 through block ID 3 are already stored. Accordingly, in the overwrite system, the entirety of the logical volume data reflecting the updated content is written in the state in which the existing data remains in the physical volume, which also demands an extra storage capacity.

The following are reference documents.

[Patent Document 1] Japanese Laid-open Patent Publication No. 2005-190139

[Patent Document 2] Japanese Laid-open Patent Publication No. 2005-122611

SUMMARY

According to an aspect of the embodiment, a storage control apparatus for controlling to temporarily store an entirety of data transferred from a host in a cache disk in response to a write request from the host to a target logical volume among a plurality of logical volumes, and store the temporarily stored entirety of data in a storage apparatus in response to data transfer from the target logical volume to a physical volume corresponding to the target logical volume, the plurality of logical volumes being assigned with the cache disk, a plurality of logical volumes corresponding to the plurality of logical volumes being assigned with the storage apparatus, the storage control apparatus includes a memory configured to store access management information concerning access from the host to each of the plurality of logical volumes, and a controller configured to refer to the access management information read from the memory, when receiving an entirety of updated data from the host, to set a write mode for data transfer from each of the plurality of logical volumes to the corresponding physical volume on the basis of the access management information to one of a difference data write mode in which difference data indicating a difference between the entirety of data stored in the storage apparatus and the entirety of updated data is written into the storage apparatus and an entire data write mode in which the entirety of updated data is written into the storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an operation processing performed by the storage system;

FIG. 4A through FIG. 4C illustrate examples of management information tables for logical volumes;

FIG. 5A and FIG. 5B are conceptual drawings illustrating the data formats of logical volume data in a cache disk;

FIG. 8 is a flowchart illustrating difference-data extracting processing;

FIG. 9 illustrates an example of an extracted difference-data information table;

FIG. 10 is a flowchart illustrating processing for writing difference data;

FIG. 11 illustrates processing for writing logical volume data;

FIG. 12A and FIG. 12B are conceptual drawings illustrating the data formats of physical volumes PV-X and PV-Y;

FIG. 13 illustrates an example of a physical volume management table;

FIG. 15 illustrates an example of a readout table;

FIG. 18 is a flowchart processing for reading data from a tape corresponding to a physical volume;

FIG. 19A and FIG. 19B illustrate examples of access management tables;

FIG. 20 is a flowchart illustrating write mode switching processing;

DESCRIPTION OF EMBODIMENTS

Preferred embodiments of the present techniques will be explained with reference to accompanying drawings.

Figure 1:
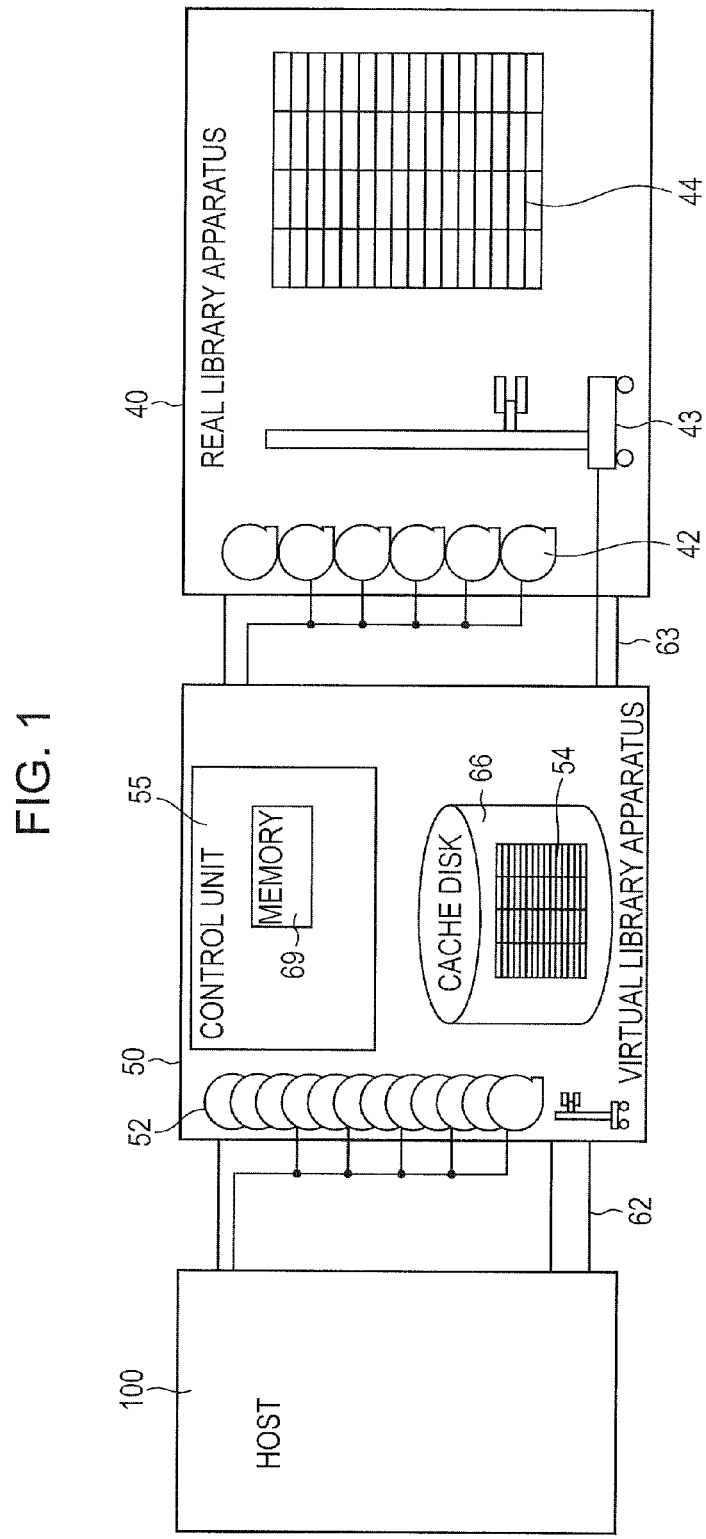
FIG. 1 illustrates an example of the configuration of a storage system.

FIG. 1 illustrates an example of the configuration of a storage system. A virtual library apparatus 50 is disposed between a real library apparatus 40 and a host 100. The virtual library apparatus 50 is connected to the host 100 via an interface 62 and is connected to the real library apparatus 40 via an interface 63.

FIG. 2 illustrates an operation processing performed by the storage system illustrated in FIG. 1. The real library apparatus (storage apparatus) 40 is, for example, a tape library apparatus that performs a recording/playback operation on tape cartridges. Each of a plurality of physical volumes 44 is assigned with a physical drive, for example, as illustrated in FIG. 1, each of a plurality of tapes.

The real library apparatus 40 includes, as illustrated in FIG. 1 and FIG. 2, the physical volumes 44 and physical drives 42 that access the physical volumes 44. The real library apparatus 40 also includes, as illustrated in FIG. 1 and FIG. 2, a transfer mechanism 43 that mounts/unmounts a tape cartridges having each tape corresponding to the physical volumes 44 onto/from the physical drives 42, and a library controller 41 that controls the physical drives 42 and the transfer mechanism 43.

The host 100 is a processor that issues various commands to the virtual library apparatus 50.

The virtual library apparatus 50 includes a control unit 55, logical drives 52, and a cache disk 66. The cache disk 66 may be formed of Redundant Arrays of Inexpensive Disks (RAID). The control unit 55 has a function of controlling a storage system, and also includes a logical layer controller 56, a physical layer controller 57, and a memory 69 that stores various tables. The memory 69 may be formed of a storage apparatus, such as a semiconductor memory or a hard disk drive (HDD).

The logical layer controller 56 controls the logical layers within the virtual library apparatus 50. The logical layer controller 56 implements functions, such as a logical volume manager 56a, a logical drive control portion 56b, and an access status monitor 56c, by performing the processing of a control program.

For example, the logical volume manager 56a and the logical drive control portion 56b mount a logical volume 54 onto the logical drive 52 in response to a MOUNT command issued by the host 100.

The physical controller 57 controls the physical layers within the virtual library apparatus 50. The physical controller 57 implements functions, such as a physical volume manager 57a, a physical drive control portion 57b, and a library interface (I/F) control portion 57c, by performing the processing of the control program.

For example, the physical drive control portion 57b and the library I/F control portion 57c execute data recall processing in response to instructions from the logical layer controller 56. The data recall processing is processing for reading data from the tape corresponding to the physical volumes 44 in the real library apparatus 40 and storing the data in the cache disk 66 for data transfer from the physical volumes 44 to the corresponding to logical volumes 54.

The logical drives 52 are drives that access a request target logical volume 54 assigned with the cache disk 66 in response to an instruction from the logical drive control portion 56b. The cache disk 66 is a storage apparatus that stores data read from the tape corresponding to the physical volumes 44 in the real library apparatus 40 as the logical volumes 54 corresponding to the physical volumes 44.

In this embodiment, a description is given, assuming that the physical volumes 44 are tapes housed in tape cartridges. However, the physical volumes 44 may be portable storage media, such as magnetic disks or optical discs. Various modifications may be made to this embodiment within the scope of the technique.

Figure 3A:
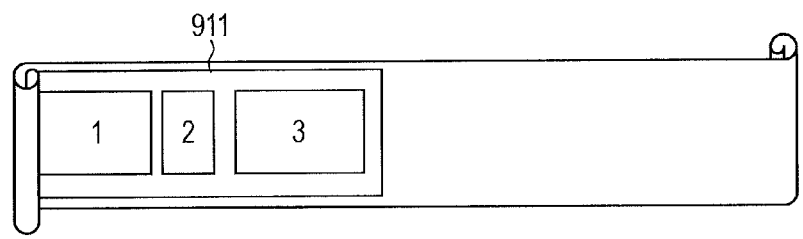
FIG. 3A through FIG. 3C are conceptual drawings illustrating the states in which data is written in a tape corresponding to a physical volume.
Figure 3B:
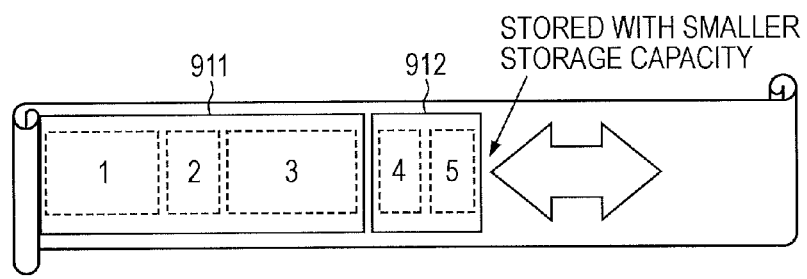
Figure 3C:
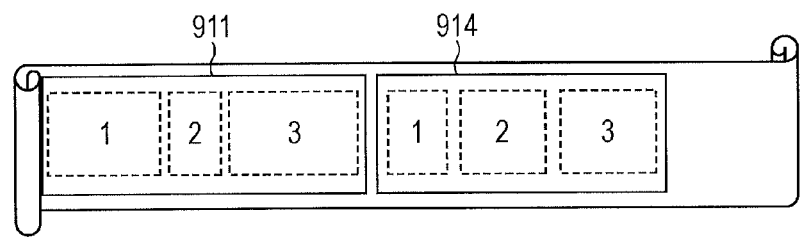

FIG. 3A through FIG. 3C are conceptual drawings illustrating the states in which data is written into a tape corresponding to a physical volume. FIG. 3A illustrates logical volume data stored in a tape corresponding to the physical volume. FIG. 3B illustrates logical volume data written into the physical volume in the difference-data write mode. FIG. 3C illustrates logical volume data written into a tape corresponding to the physical volume in the entire-data write mode. That is, FIG. 3A through FIG. 3C are conceptual drawings illustrating logical volume data written into recording regions on a tape in a backend.

In FIG. 3A, the logical volume data (block ID 1 through block ID 3) are stored in a recording region 911 on the tape. If the difference-data write mode is set to a write mode for data transfer of the logical volume to be updated, as illustrated in FIG. 3B, updated logical volume data having only difference data 4 and 5 are written into a recording region 912 positioned after the recording region 911 on which the logical volume data having block ID 1 through block ID 3 are recorded.

More specifically, when storing data on a tape in a backend, the logical volume manager 56a of the logical layer controller 56 extracts the differential state of the update target logical volume. Then, the logical layer controller 56 instructs the physical layer controller 57 to write the difference data to a tape for data transfer from the update target logical volume to the physical volume corresponding to the update target logical volume.

As a comparative example, a case where the entire-data write mode is employed, as illustrated in FIG. 3C, is discussed below. The entirety of the data including the updated data, i.e., updated logical volume data (block ID 1 through block ID 3), which is the entirety of the data reflecting the updated content, is written into a recording region 914 positioned after the recording region 911 in which the logical volume data (block ID 1 through block ID 3) are recorded. Accordingly, the recording region 911 that has been made unnecessary by overwriting the entirety of the data still remains. Particularly in storage systems that may update data many times, as the recording area in which unnecessary data is stored increases, the available space decreases quickly even in a large-capacity library system having many storage media. This may cause a shortage of the storage capacity for storing logical volume data therein.

Accordingly, with the use of the difference-data write mode illustrated in FIG. 3B, it is possible to store data with a smaller storage capacity than with the use of the entire-data write mode illustrated in FIG. 3C. Thus, when updating data, the efficient use of the storage capacity of a tape, which is a physical volume, is achieved.

When the writing of data is performed in the difference-data write mode, difference data may be distributed in recording regions separated from each other on the same tape or in recording regions on different tapes. In this case, it takes longer to access data when data recall processing is performed. Accordingly, the storage of data using a combination of the difference-data write mode and the entire-data write mode is efficient.

A management method for the logical volumes is described below through illustration of examples of management information tables illustrated in FIG. 4A through FIG. 4C. A management information table is generated by the logical layer controller 56, and is added, as part of logical volume data, at a position, for example, immediately before block data, and is finally recorded in a recording region on the tape by the physical controller 57.

FIG. 4A illustrates registration information of a volume information table in which management information concerning all logical volumes is registered. The management information includes the volume name, generation time stamp, access time stamp, generation number, data size, and number of blocks as the registration information.

In the column of the generation time stamp, a generation time stamp indicating the time and date at which the logical volumes were generated is registered. In the column of the access time stamp, the final access time stamp indicating the time and date at which final access to the logical volumes was made is registered. In the column of the generation number, the number of times overwriting has been performed by the host 100 is registered. The generation number is 0 when the logical volumes were generated, and the generation number is 1 when the logical volume was written into for the first time, and is thereafter incremented every time the writing (mount) processing is performed. In the column of the data size, the size of the logical volumes including the size of the management table is registered. In the column of the number of blocks, the number of blocks written from the host 100 is registered.

FIG. 4B illustrates registration information of a block management table. The block management table stores registration information therein for each block which is written from the host 100. The block management table includes the block ID, block type, compression flag, data size, and generation number as the registration information. In the column of the block ID, the block ID is started from 1 and is incremented for each block which is written from the host 100. If the data is overwritten, 1 is registered again since the data is overwritten from the head block.

In the column of the block type, the data block or the file mark is registered. In the column of the compression flag, an identifier "compressed/non-compressed" is registered. In the column of the data size, the data size is registered. If the data block is compressed data, the data size of the block after being compressed is registered. In the column of the generation number, the generation number of the logical volume when it was written from the host 100 is registered.

FIG. 4C illustrates registration information of a block management table group. Data of N blocks are formed into a block management table group, which is disposed before block data in the logical volume data format. In the block management table group, the position offset of the previous block management table group, the block management tables of the blocks having block ID 1 through block ID N, and the position offset of the subsequent block management table group are sequentially registered.

After the block ID N, i.e., concerning the block ID (N+1), when the block having block ID (N+1) is written, data of N new blocks are formed into a new block management table group. Then, data having block ID (N+1) is written after the new block management table group.

Figures 5A, 5B:
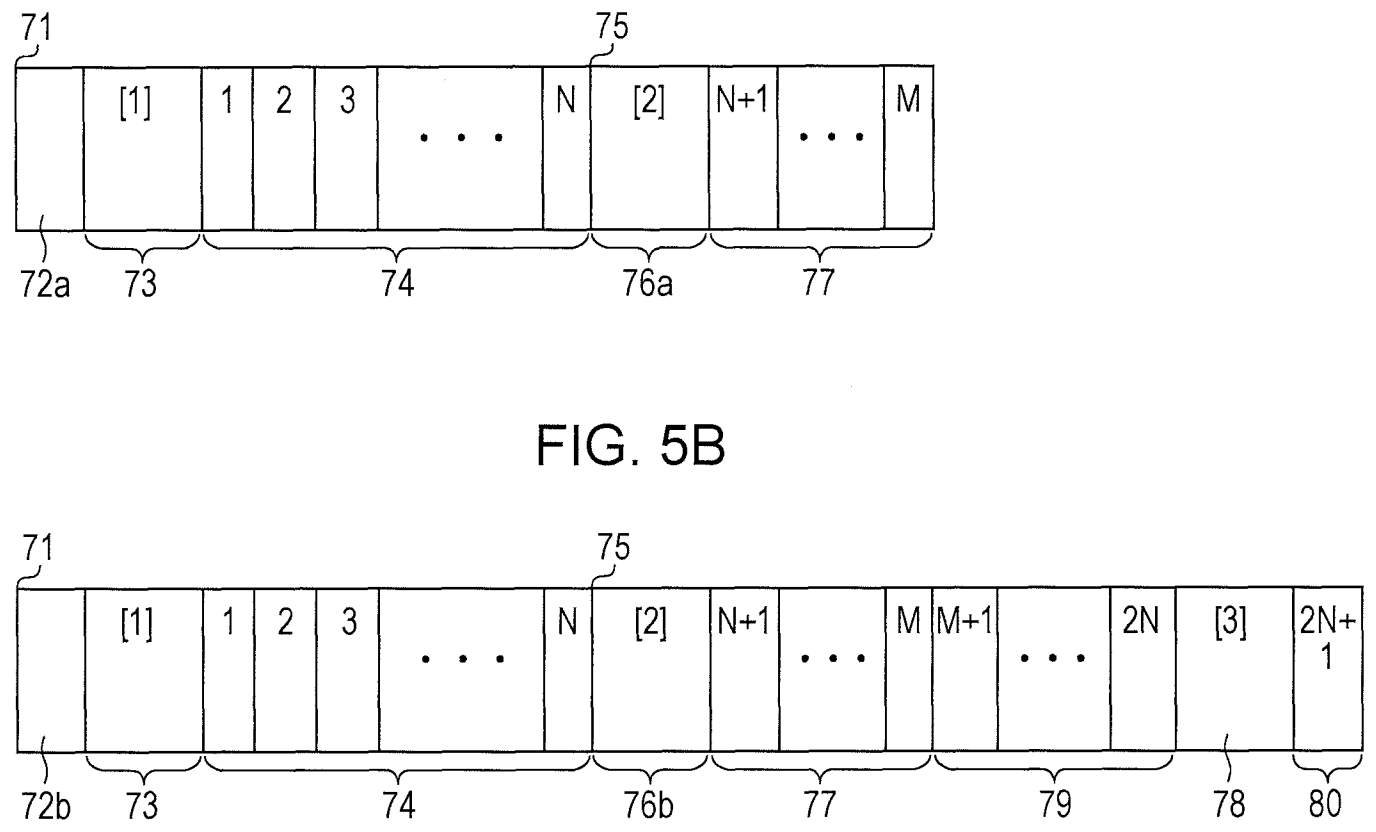

FIG. 5A and FIG. 5B are conceptual drawings illustrating the data format of a logical volume in a cache disk. FIG. 5A illustrates data having block ID 1 through block ID M written from the host 100. In a recording region from a leading edge 71 to a trailing edge 75, a volume information table 72a, a block management table group 73 for N blocks concerning logical volume data [1], and N block data 74 are sequentially disposed. Subsequently, from the leading edge, a block management table group 76a concerning logical volume data [2] and data 77 having block ID (N+1) through block ID M are disposed.

FIG. 5B illustrates data having block ID (M+1) through block ID (2N+1) which are additionally written in the incremental write mode by the host 100. A volume information table 72b is a table obtained by overwriting the registration information of the volume information table 72a in accordance with the writing of the data having block ID M through block ID (2N+1).

A block management table group 76b is a table group obtained by overwriting the registration information of the block management table group 76a in accordance with the writing of the data having block ID M through block ID 2N. A block management table group 78 is a table group added in accordance with the writing of the data having block ID (2N+1).

In a recording region after the recording region in which the data having block ID M of the logical volume data [2] is recorded, data 79 having block ID (M+1) through block ID 2N is disposed, and then, data 80 having block ID (2N+1) of the logical volume data [3] is disposed.

In accordance with the writing of the data having block ID M through block ID (2N+1), the above-described volume information table 72a is updated to the volume information table 72b. More specifically, in the column of the generation time stamp, a time stamp for when the logical volume was generated is registered.

In the column of the access time stamp, the time at which the logical volume was released (unmounted) by the writing of block ID (2N+1) is registered. In the column of the generation number, X+1 (assuming that the time at which block M was written is X) is registered. In the column of the data size, the total value of the data size of the data having block ID 1 through block ID (2N+1) and the data size of the management tables is registered. In the column of the number of blocks, 2N+1 is registered.

Figures 6, 7:
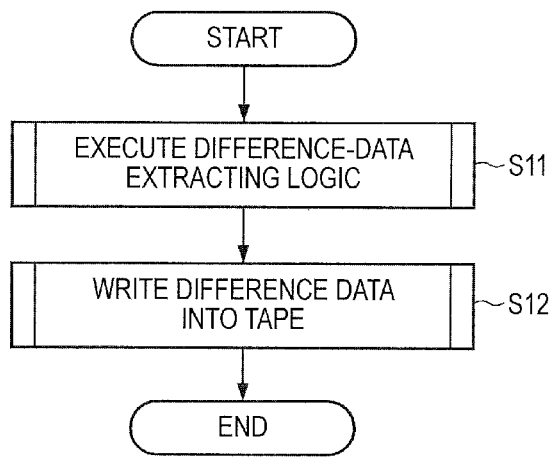
FIG. 6 illustrates a block management table.
FIG. 7 is a flowchart illustrating processing for storing data in a tape corresponding to a physical volume.

FIG. 6 illustrates a block management table. The registration information of the block management table having block ID 1 through block ID (2N+1) includes the block ID, block type, compression flag, data size, and generation number. In the generation number of block ID 1 through block ID M, X is registered, and in the generation number of block ID (M+1) through block ID (2N+1), X+1 is registered.

The registration information of the block management table for block ID (M+1) through block ID 2N is added to the registration information of the block management table group 76a and is updated as the block management table group 76b. The registration information of the block management table for block ID (2N+1) is written as the block management table group 78. In reality, both the data blocks and file marks are stored in the logical volume. For a simple description, however, it is assumed that data are all data blocks.

FIG. 7 is a flowchart illustrating processing for storing data in a tape corresponding to a physical volume 44. Upon completion of the writing of data by the host 100, the control unit 55 starts processing for storing data in the tape corresponding to the physical volume 44. In S11, the logical layer controller 56 executes a difference-data extracting logic, which is described later, so as to extract difference data. Then, in response to an instruction from the logical layer controller 56, the physical layer controller 57 issues a write command for writing the extracted difference data to the real library apparatus 40. The library controller 41 of the real library apparatus 40 mounts the tape corresponding to the physical volume 44 onto the physical drive 42. Then, in S12, the physical drive control portion 57b executes the writing of the extracted difference data into the tape corresponding to the physical volume 44.

FIG. 8 is a flowchart illustrating difference-data extracting processing. Upon completion of writing data into the tape corresponding to the logical volume 54 in response to a data update request from the host 100, the control unit 55 starts the difference-data extracting logic. In S21, the logical layer controller 56 obtains the generation number of the logical volume to be updated (update target logical volume) from the volume information table.

Then, in S22, the logical layer controller 56 obtains the number of blocks of the update target logical volume from the volume information table. In S24, the logical layer controller 56 obtains the generation number of the block IDs A (A=1 through 2N+1) of the update target logical volume from the volume information table. It is then determined in S25 whether the generation number is X+1. If the result of S25 is YES, the process proceeds to S26 in which the logical layer controller 56 records the head block ID (M+1) of the difference data in an extracted difference-data information table stored in the memory 69. If it is determined in S25 that the generation number is not X+1, the logical layer controller 56 returns to loop processing S23 through S27, and repeats the loop processing until the block ID has reached 2N+1. Then, the logical layer controller 56 extracts the final block ID of the difference data, and registers the extracted block ID in the extracted difference-data information table stored in the memory 69.

FIG. 9 illustrates the extracted difference-data information table obtained by the difference-data extracting processing. The extracted difference-data information includes the difference head block ID and the final block ID. In FIG. 9, M+1 is registered as the difference head block ID, and 2N+1 is registered as the final block ID in the extracted difference-data information table.

FIG. 10 is a flowchart illustrating processing for writing difference data. FIG. 11 illustrates processing for writing logical volume data. The logical layer controller 56 instructs the physical layer controller 57 to write difference data by the use of the extracted difference-data information table. In response to this instruction, the physical layer controller 57 instructs the library controller 41 to write data.

The library controller 41 controls the transfer mechanism 43 to remove a tape cartridge, which is having a tape corresponding to the physical volume 44 to be processed, from a storage casing and to transfer the tape cartridge to the physical drive 42. The tape cartridge is then mounted on the physical drive 42.

In FIG. 10, in S31, the library controller 41 controls the physical drive 42 to write the volume information table into a recording region on the tape. More specifically, as illustrated in FIG. 11, writing is started from a leading edge 81 of a recording region, and a volume information table 82 of the logical volume to be processed is written into the recording region.

Then, in S32, the library controller 41 writes a difference-data block management table group including the block management table of the difference-data head block. More specifically, as illustrated in FIG. 11, a difference-data block management table group 83 including a block management table having block ID (M+1), which is the difference-data head block, and block management tables of subsequent blocks is written.

Then, in S33, data having the difference-data head block and subsequent blocks is written. More specifically, as illustrated in FIG. 11, data having block ID (M+1) through block ID (2N+1) are written. Accordingly, in the recording region between the leading edge 81 and the trailing edge 85 of the logical volume data, the volume information table 82 of the logical volume to be processed, the difference-data block management table group 83, and data 84 having block ID (M+1) through block ID (2N+1) are written in the direction indicated by the arrows in FIG. 11 according to a streaming method. The difference-data block management table group 83 is written block by block.

The data recall processing is described below. As illustrated in FIG. 12A, data having the generation number M of logical volume data LV-A is written into a recording region 89, and, as illustrated in FIG. 12B, difference data having the generation number M+1 is written into a recording region 95. Under these circumstances, processing for reading back the data having the generation number M+1 to the cache disk 66 is described below. In this embodiment, it is assumed that M is 1.

Depending on the data size of data to be transferred to the physical drive 42, the data may be divided into a plurality of blocks and are recorded on the tape. However, for a simple representation, in FIG. 12A and FIG. 12B, one block is illustrated as one piece of logical volume data.

FIG. 12A is a conceptual drawing illustrating the data format of a physical volume PV-X, and FIG. 12B is a conceptual drawing illustrating the data format of a physical volume PV-Y. It is assumed that the physical volumes PV-X and PV-Y are physically different, although they are not illustrated in FIG. 12A and FIG. 12B. That is, the data is distributed and recorded on different tapes. The time at which the data was updated is not immediately after the logical volume data LV-A having the generation number M had been written, but after another data had been written.

After the logical volume data LV-A through LV-J having the generation number M recorded in recording regions 89 through 91 on the tape, the difference data of the logical volume data LV-A having the generation number M+1 is recorded in a recording region 92. In the recording region 92, a logical volume information table 93, a difference-data block management table group 94, and difference-data logical volume data 95 are sequentially disposed. Thereafter, logical volume data LV-K and subsequent data are recorded in a recording region 96.

A physical volume management table is a collection of entries having information for managing logical volume data written into each physical volume. FIG. 13 illustrates an example of a physical volume management table. Examples of the entries are the logical volume name, head block ID, difference flag, generation number, data size 1, data size 2, logical volume block ID, number of logical blocks, writing time and date, and validity flag.

The head block ID is the first block number of a logical volume written into a physical volume. The difference flag indicates entirety (0) or difference (1). The data size 1 is the image size of the logical volume data of a logical volume. The data size 2 is the data size of all the logical volumes (when they are connected). The logical volume block ID is the head block ID of a logical block written in the physical volume.

The validity flag is a flag indicating whether the logical volume data is valid (1) or invalid (0). If the logical volume data is not data written in difference-data write mode in response to an instruction from the host 100, but is data written in the entire-data write mode, the previously written data is set to be invalid. Those items of information are registered in the physical volume management table by the physical layer controller 57 when storing the logical volume data to be processed in the tape of the real library apparatus 40. The physical volume management table is stored in the memory 69.

Figure 14:
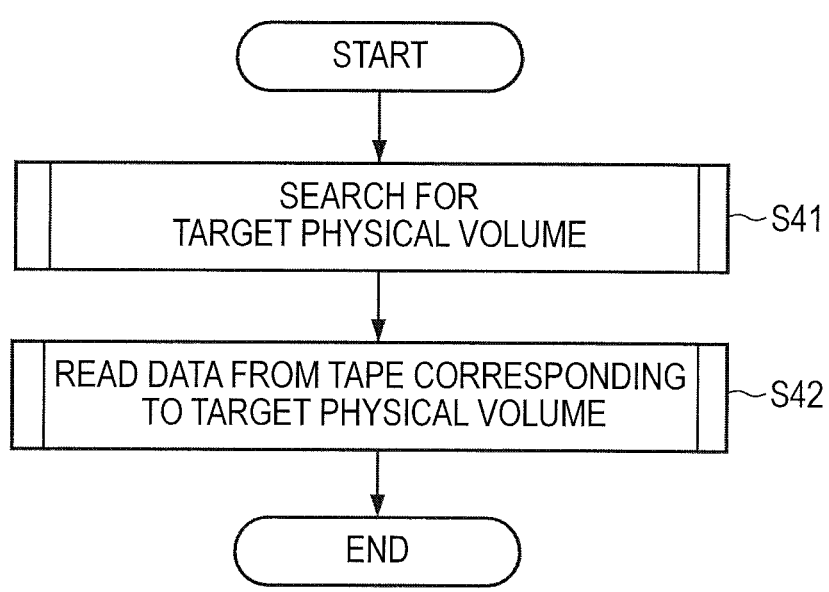
FIG. 14 is a flowchart illustrating processing for reading data from a tape corresponding to a physical volume.

Reading processing when access from the host 100 is made again after the logical volume data is driven out of the cache disk 66 is described below. FIG. 14 is a flowchart illustrating processing for reading data from a tape corresponding to a physical volume. The physical layer controller 57 searches for a target logical volume from a physical volume management table. Then, in S41, the physical layer controller 57 searches for a target physical volume including the entirety or difference data of the target logical volume.

When searching for a request target physical volume, the physical layer controller 57 generates a readout table, such as that illustrated in FIG. 15. In the readout table, entries, such as the index, physical volume name, generation number, data size 1, data size 2, logical volume block ID, and number of logical volumes, are registered.

In S42, in accordance with the readout table illustrated in FIG. 15, a request target physical volume is mounted in a suitable order, and subject data is read out. More specifically, the physical drive control portion 57*b* of the physical controller 57 gives an instruction to read out a tape corresponding to a target physical volume in accordance with the readout table. The library controller 41 controls the transfer mechanism 43 to remove the tape cartridge from the storage casing and to transfer the removed tape cartridge to the physical drive 42. The transferred tape is mounted on the physical drive 42. Then, the physical drive 42 reads the logical volume data from the tape.

Figure 16:
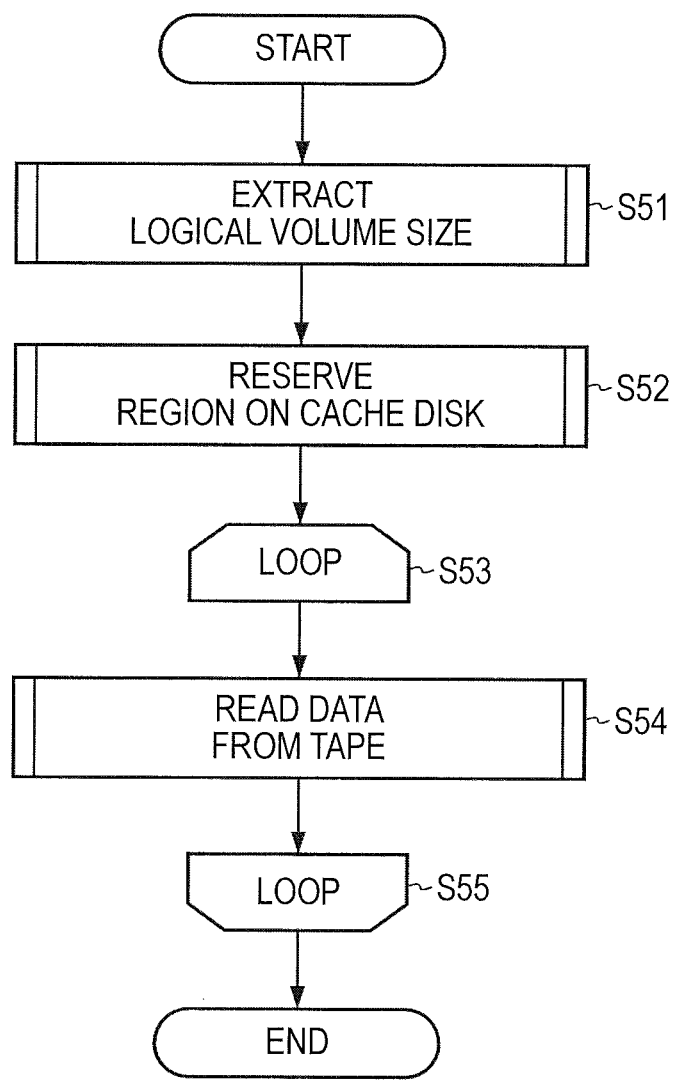
FIG. 16 is a flowchart illustrating processing for reading data from a tape corresponding to a physical volume.

FIG. 16 is a flowchart illustrating processing for reading logical volume data from a tape corresponding to a physical volume. In S51, the physical layer controller 57 extracts the data size of the entire logical volume from the physical volume management table having the maximum generation number. The physical layer controller 57 informs the logical layer controller 56 of the extracted data size.

Then, in S52, the logical layer controller 56 reserves in the cache disk 66 a recording region having a storage capacity for the extracted data size of the entire logical volume data. The physical layer controller 57 instructs the library controller 41 to read out the logical volume data in ascending order of generation number.

In S54, the logical layer controller 56 writes the read physical volume data into the cache disk 66. Until the reading of all the data from the tape corresponding to the physical volume is completed, loop processing from S53 to S55 is repeated.

Figure 17A:
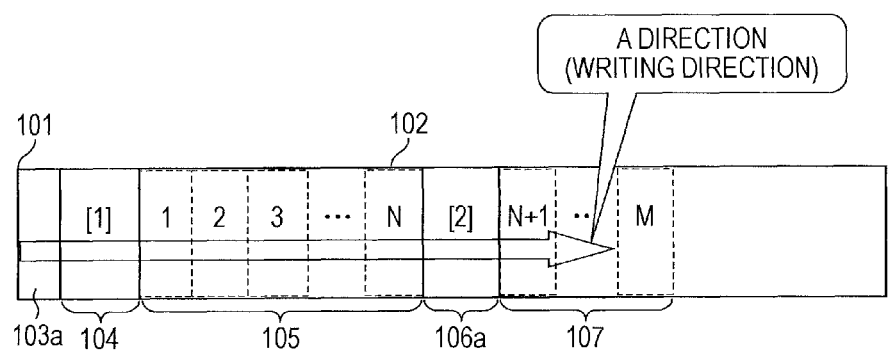
FIG. 17A and FIG. 17B are conceptual drawings illustrating processing for writing data into a recording region of a cache disk corresponding to a logical volume.
Figure 17B:
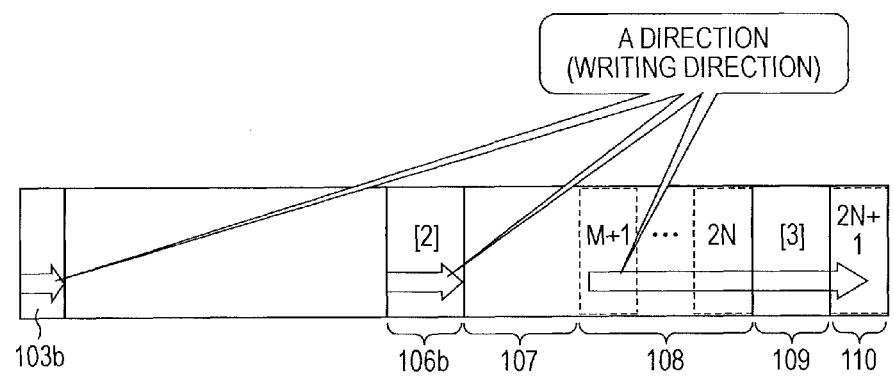
Figure 21:
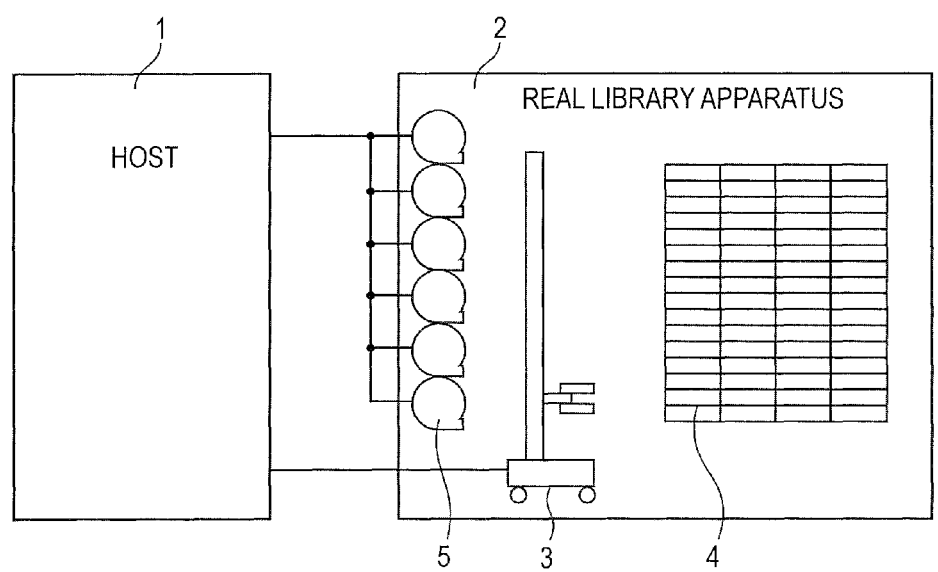
FIG. 21 is a conceptual drawing illustrating a storage system using a library apparatus.
Figure 22:
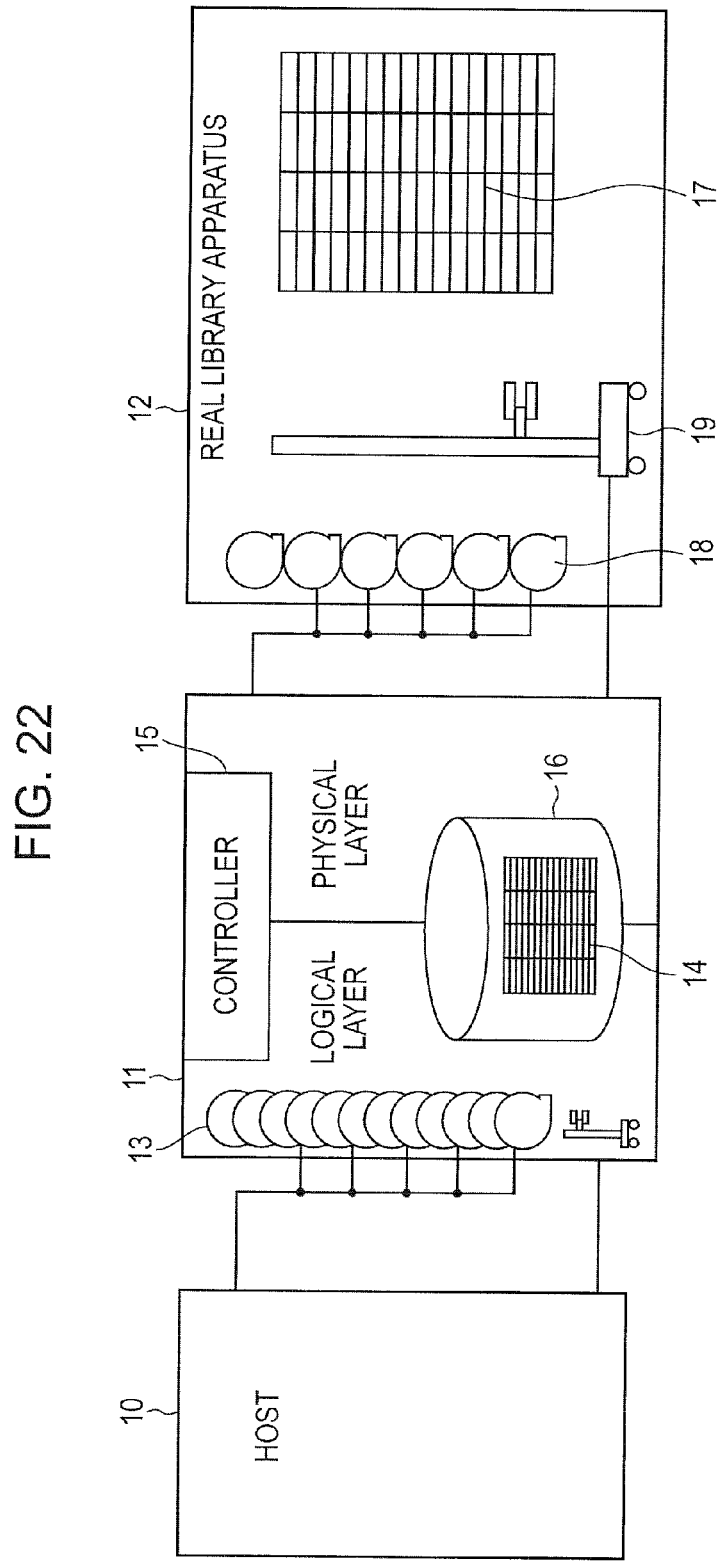
FIG. 22 is a conceptual drawing illustrating a storage system using a virtual library apparatus.
Figure 23A:
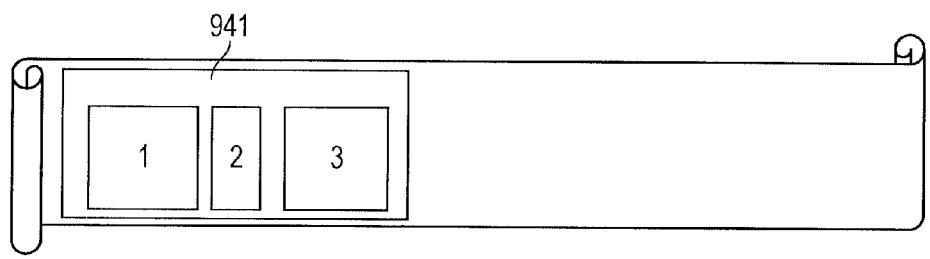
FIG. 23A through FIG. 23C are conceptual drawings illustrating the states in which data is written in a recording region of a cache disk corresponding to a logical volume.
Figure 23B:
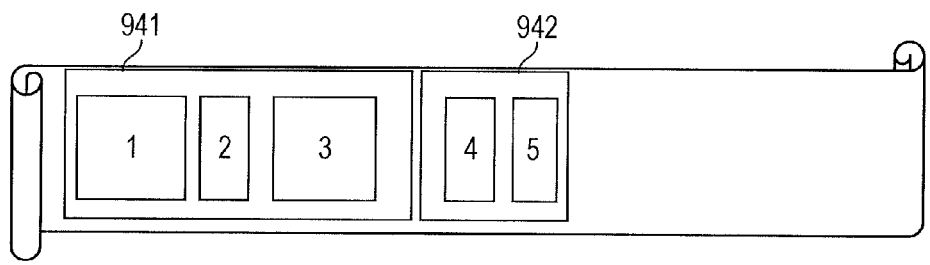
Figure 23C:
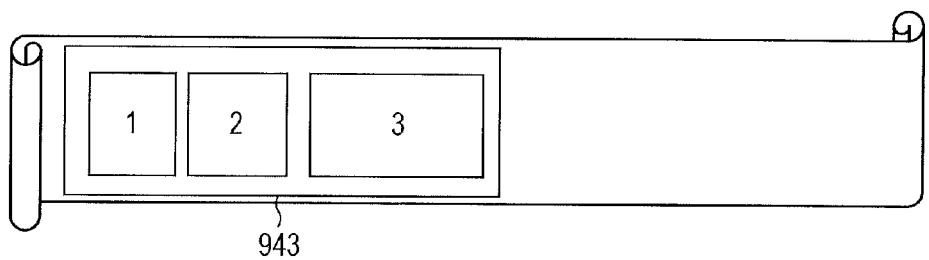
Figure 24A:
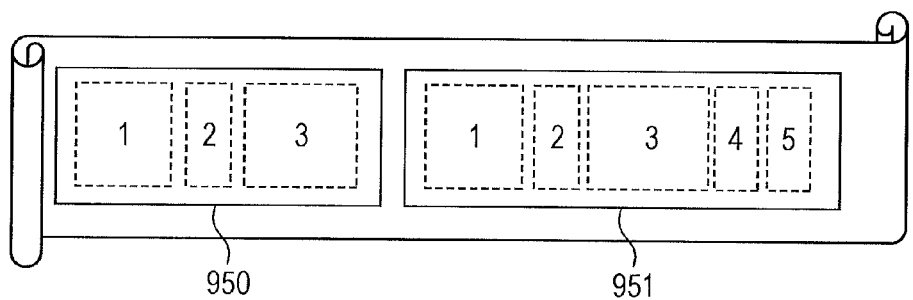
FIG. 24A and FIG. 24B are conceptual drawings illustrating the states in which data is written in a tape corresponding to a physical volume.
Figure 24B:
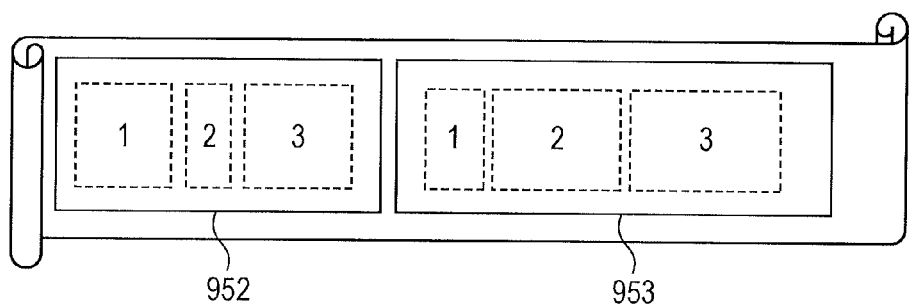

FIG. 17A and FIG. 17B are conceptual drawings illustrating processing for writing data into a recording region of a cache disk corresponding to a logical volume. FIG. 17A illustrates processing for writing data having the generation number M into a recording region of a cache disk. The reading of data from a tape corresponding to a physical volume is performed sequentially from the head of tape. Accordingly, the read data is sequentially written in a region starting from the head of the logical volume of the cache disk 66 in the direction indicated by the arrow A in FIG. 17A.

In this example, since the generation M is the first generation, data is written in a region starting from a leading edge 101 of the logical volume. In a recording region from the leading edge 101 to a trailing edge 102 of the logical volume data, a volume information table 103a, a block management table group 104a, and block data 105 having block ID 1 through block ID N are sequentially written. Subsequently, a block management table 106a and block data 107 having block ID (N+1) through block ID M are sequentially written.

FIG. 17B illustrates processing for writing data having the generation number M+1 into a recording region of a cache disk. The volume information table 103a and the block management table group 106a are overwritten by a volume information table 103b and a block management table group 106b, respectively, including updated data.

Starting from a position continuing from the stored block data 107, block data 108 having block ID (M+1) through block ID 2N, a block management table group 109, and block data 110 having block ID (2N+1) are sequentially written. Since it is possible to obtain the block size from the volume information table, the block data having block ID (M+1) through block ID (2N+1) may be written in some midpoint in the data of the logical volume.

FIG. 18 is a flowchart illustrating processing for reading data from a tape corresponding to a physical volume. The physical layer controller 57 instructs the library controller 41 to read data. The library controller 41 controls the transfer mechanism 43 to remove a tape cartridge, which is having a tape corresponding to a target physical volume, from a storage casing, and to transfer the removed tape cartridge to the physical drive 42. In S61, the library controller 41 mounts the transferred tape on the physical drive 42.

The physical layer controller 57 first obtains the head block ID of a target logical volume data from the physical volume management table. Then, in S62, the physical drive control portion 57b positions the head in the recording region in the physical volume corresponding to the head block ID of the logical volume data.

In S63, the physical drive control portion 57b controls the physical drive 42 to read one block from the position of the tape corresponding to the physical volume so as to obtain the logical volume information table. In S64, the physical drive control portion 57b further reads one block from the tape corresponding to the physical volume so as to read the difference-data block management table group.

Then, the logical layer controller 56 writes the read logical volume information and the difference-data block management table group into a predetermined recording region in the cache disk 66. In S65, the physical drive control portion 57b reads from the start to the end of the difference data from the tape corresponding to the physical volume according to a streaming method. The logical layer controller 56 then writes the read difference data into a predetermined recording region of the cache disk 66. Thereafter, the logical layer controller 56 transfers the data in the cache disk 66 to the host 100.

As described above, when storing data in a storage apparatus (physical volume) of a backend, only the difference of logical volume data is extracted and stored as difference data, thereby making it possible to efficiently use the storage capacity of the storage apparatus of the backend.

If data is distributed in a storage apparatus of the backend by the writing processing in the difference-data write mode, it takes time to access the data when performing recall processing from the storage apparatus of the backend. Accordingly, it is preferable that data be efficiently stored by using a suitable combination of the difference-data write mode and the entire-data write mode.

A description is now given of processing for switching between the difference-data write mode and the entire-data write mode. The control unit 55 of the virtual library apparatus 50 switches between the difference-data write mode in which only the difference data is stored in a physical volume and the entire-data write mode in which the entirety of data is stored. When switching from the difference-data write mode to the entire-data write mode, the control unit 55 automatically writes logical volume data in the entire-data write mode.

The access status monitor 56c of the logical layer controller 56 collects statistical information concerning the access frequencies and the data amount for each logical volume as access status monitor information. Then, the access status monitor 56c generates an access management table and accumulates the access status monitor information in the access management table.

If the entire data amount of the virtual library apparatus 50 is much less than the data capacity of the cache disk 66, the entirety of the data may be stored in the cache disk 66. Accordingly, the entire logical volume data is stored in a tape corresponding to the physical volume of the backend in the difference-data write mode.

As the data amount of the virtual library apparatus 50 becomes closer to the limit of the storage capacity of the cache disk 66, it is more likely that a logical volume having a low access frequency will be driven out of the cache disk 66 and will be switched to the off-cache state depending on the subsequent usage of the cache disk 66. Accordingly, the data is rewritten into the tape corresponding to the physical volume in the entire-data write mode. Thereafter, until the access frequency is relatively increased, the data is stored in the tape corresponding to the physical volume in the entire-data write mode even if access is made from the host 100 and it takes time to update the data.

When the access frequency is relatively increased to such a degree that it exceeds a certain condition, the access status monitor 56c determines that the on-cache state may be maintained and switches from the entire-data write mode to the difference-data write mode.

Accordingly, the data recall processing that is performed when a request to access a logical volume in the off-cache state is made again from the host 100 may be completed only by reading data from a single tape corresponding to a single physical volume. Thus, the number of times a tape corresponding to a physical volume is mounted is small, thereby making it possible to shorten the processing time for the data recall processing.

FIG. 19A and FIG. 19B illustrate examples of access management tables. The access status monitor 56c monitors the access frequencies while the cache disk 66 is being used, and registers statistical information concerning the access frequencies and the data amount thereof for each logical volume in an access management table.

In the access management tables illustrated in FIG. 19A and FIG. 19B, the access frequency, data amount, and mode for each of the logical volumes LV-A through LV-MN are registered. The access management table is stored in the memory 69. Information concerning the data amount stored in the access management tables is the amount of usage or the utilization factor determined from the amount of usage and the total storage capacity of the cache disk 66.

The access frequencies are determined from the number of read/write accesses from the host 100 during one week, one month, and three months. The data amounts are obtained by accumulating the data amounts of the logical volumes. In the access management table, the access frequencies are registered in descending order and the data amounts are registered in ascending order. The priorities of the access frequencies are determined in order of one week, one month, and three months.

FIG. 20 is a flowchart illustrating write mode switching processing. In S72, the logical layer controller 56 accumulates the data amounts of the individual logical volumes starting from the head in the access management table. Then, the logical layer controller 56 determines in S73 whether the amount of usage (accumulated capacity) of the cache disk 66 exceeds 80% of the total capacity.

If the result of S73 is YES, the process proceeds to S74 in which the logical layer controller 56 sets the difference-data write mode as write modes for data transfer of the accumulated logical volumes. Then, in S75, the logical layer controller 56 sets the entire-data write mode as write modes for data transfer of all the remaining logical volumes.

If it is determined in S73 that the accumulated capacity is 80% or lower, the logical layer controller 56 executes loop processing (S71 through S76) on each logical volume. Thereafter, in S77, the logical layer controller 56 sets the difference-data write mode as write modes for data transfer of all the logical volumes.

Concerning the accumulation of the data amounts, the data amounts are accumulated in descending order of access frequency on the basis of the access frequency information for each logical volume. In an access management table, since the logical volumes are disposed in descending order of access frequency, the data amounts are accumulated in this order accordingly. In the calculation process, it may be determined that the access frequency of logical volume data having an accumulated capacity 80% or less is higher than that of logical volume data having an accumulated capacity over 80%.

Accordingly, it is more likely that access will be made from the host 100 to logical volume data having an accumulated capacity 80% or less of the total capacity in a relatively short period of time after the accumulated capacity exceeds 80%. Thus, the possibility that such logical volume data will be driven out of the cache disk 66 is low, and accordingly, it is less likely that data recall processing will be executed.

By the use of the difference-data write mode, logical volume data may be distributed and recorded in recording regions separated from each other of a physical volume or in recording regions of different physical volumes of the real library apparatus 40. In this case, it takes some time to execute data recall processing, but unfavorable situations, such as a time-out error, are not generated.

On the other hand, the possibility that logical volume data having an accumulated capacity exceeding 80% of the total capacity will be driven out of the cache disk 66 is high since the access frequency is low for such logical volume data. Accordingly, if access is made from the host 100, data recall processing will be executed, and thus, the logical layer controller 56 sets the entire-data write mode as write modes for data transfer of such logical volumes. By setting the entire-data write mode, the possibility of logical volume data being distributed to a plurality of tapes corresponding to a plurality of physical volumes is decreased, and accordingly, the number of times the tape is mounted is small, thereby achieving efficient data recall processing.

If the accumulated capacity is 80% or less of the total storage capacity, the logical layer controller 56 sets the difference-data write mode. That is, in the access management table, the flag indicating the difference-data write mode is set, as illustrated in FIG. 19A.

In contrast, if the accumulated capacity exceeds 80% of the total storage capacity, the logical layer controller 56 sets the difference-data write mode to store logical volume data having an accumulated capacity of 80% or less in a tape corresponding to a physical volume of a backend, and sets the entire-data write mode to store logical volume data having an accumulated capacity exceeding 80% in the tape of the backend.

As the space of the cache disk 66 becomes decreased, logical volume data having lower access frequencies are sequentially driven out of the cache disk 66 in accordance with the logic based on the frequency of access from the host 100. The logical volume data driven out of the cache disk 66 is written into a target tape corresponding to a physical volume in the real library apparatus 50.

In response to access made from the host 100, the logical volume data driven out of the cache disk 66 is read out again from the tape of the real library apparatus 50. Then, data recall processing is performed for storing the read logical volume data in a predetermined recording region of the cache disk 66 corresponding to the logical volume.

Accordingly, logical volume data having high access frequencies remains in the cache disk 66, thereby making it possible to efficiently use the cache disk 66. Although in this embodiment a predetermined threshold of the accumulated capacity is 80%, it is not restricted to this value, and may be changed as desired.

In the access management table illustrated in FIG. 19B, either of the difference-data write mode or the entire-data write mode is set as a write mode for data transfer of each logical volume. In this manner, a write mode for data transfer of a target logical volume may be changed from the difference-data write mode originally set to the entire-data write mode because the logical volume data are distributed in the backend. Then, the data is written into a tape corresponding to the physical volume. If the write mode is changed from the entire-data write mode to the difference-data write mode because of an increase in the access frequency, the difference-data write mode may be maintained without being switched to the entire-data write mode.

Accordingly, the write mode may be switched between the difference-data write mode and the entire-data write mode on the basis of the frequency of access from the host or the amount of usage of the cache disk (the amount of data for the logical volumes). It is thus possible to suitably switch between the difference-data write mode and the entire-data write mode. Therefore, physical volumes having a restricted storage capacity may be efficiently used, thereby achieving efficient data updating processing.

According to a storage control apparatus, a storage system, and a storage control method, either of the difference-data write mode or the entire-data write mode may be set as a write mode for data transfer of each logical volume on the basis of access management information. It is thus possible to efficiently use physical volumes having a restricted storage capacity, thereby achieving efficient data updating processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus for controlling to temporarily store an entirety of data transferred from a host in a cache disk in response to a write request from the host to a target logical volume among a plurality of logical volumes, and store the temporarily stored entirety of data in a storage apparatus in response to data transfer from the target logical volume to a physical volume corresponding to the target logical volume, the plurality of logical volumes being assigned with the cache disk, a plurality of logical volumes corresponding to the plurality of logical volumes being assigned with the storage apparatus, the storage control apparatus comprising:

a memory configured to store access management information concerning access from the host to each of the plurality of logical volumes; and a controller configured to refer to the access management information read from the memory, when receiving an entirety of updated data from the host, to set a write mode for data transfer from each of the plurality of logical volumes to the corresponding physical volume on the basis of the access management information to one of a difference data write mode in which difference data indicating a difference between the entirety of data stored in the storage apparatus and the entirety of updated data is written into the storage apparatus and an entire data write mode in which the entirety of updated data is written into the storage apparatus, wherein the access management information includes access frequency information concerning frequency of access from the host to each of the logical volumes and data information concerning amount of data for each of the logical volumes, and the controller configured to:

accumulate the amount of data for all the logical volumes in descending order of the frequency of access based on the access management information, determine whether the accumulated total amount of data for all the logical volumes exceeds a predetermined percentage of total capacity of the cache disk, when the accumulated total amount of data for all the logical volumes is equal to or less than the predetermined percentage of the total data capacity of the cache disk, set the difference data write mode as a write mode for data transfer of all the logical volumes, and when the accumulated total amount of data for all the logical volumes exceeds the predetermined percentage of the total storage capacity of the cache disk, set the difference data write mode as a write mode for data transfer of logical volumes corresponding to a part, among all the logical volumes, in which the amount of data of the logical volumes accumulated in descending order of the frequency of access is equal to or less than the predetermined percentage of the total storage capacity of the cache disk, and set the entire data write mode as a write mode for data transfer of logical volumes corresponding to a part, among all the logical volumes, in which the amount of data of the logical volumes accumulated in descending order of the frequency of access is exceeding the predetermined percentage of the total data capacity of the cache disk.

2. The storage control apparatus according to claim 1, wherein the access management information includes access frequency information concerning frequency of access from the host to each of the logical volumes and data information concerning amount of data for each of the logical volumes, wherein the controller controls to calculate total amount of data for all the logical volumes on the basis of the amount of data for each of the logical volumes, set a write mode for data transfer of all of the logical volumes to the difference data write mode when the total amount of data is equal to or less than a predetermined value, and set a write mode for data transfer of a logical volume selected on the basis of the access frequency information to the entire data write mode when the total amount of data exceeds the predetermined value.

3. The storage control apparatus according to claim 1, wherein the access management information includes access frequency information concerning frequency of access from the host to each of the logical volumes and data information concerning amount of data for each of the logical volumes, wherein the controller controls to accumulate the amount of data for the logical volumes in descending order of the frequency of access on the basis of the access frequency information before the accumulated amount of data exceeds a predetermined value, and set a write mode for data transfer of logical volumes with the amount of data unused for the accumulation to the entire data write mode.

4. The storage control apparatus according to claim 1, wherein, as a result of writing the difference data in the logical volume into a tape mounted on the storage apparatus in the difference data write mode, if the tape is different from a tape into which the latest entirety of data has been written, the controller controls to set the write mode for the logical volume to the entire data write mode.

5. A storage system comprising:
a cache disk configured to temporarily store an entirety of data transferred from a host in response to a write request from the host to a target logical volume among a plurality of logical volumes;
a storage apparatus configured to store the temporarily stored entirety of data in response to data transfer from the target logical volume to a physical volume corresponding to the target logical volume, the plurality of logical volumes being assigned with the cache disk, a plurality of logical volumes corresponding to the plurality of logical volumes being assigned with the storage apparatus;
a memory configured to store access management information concerning access from the host to each of the plurality of logical volumes; and
a controller configured to refer to the access management information read from the memory, when receiving an entirety of updated data from the host, to set a write mode for data transfer from each of the plurality of logical volumes to the corresponding physical volume on the basis of the access management information to one of a difference data write mode in which difference data indicating a difference between the entirety of data stored in the storage apparatus and the entirety of updated data is written into the storage apparatus and an entire data write mode in which the entirety of updated data is written into the storage apparatus, wherein
the access management information includes access frequency information concerning frequency of access from the host to each of the logical volumes and data information concerning amount of data for each of the logical volumes, and
the controller configured to:
accumulate the amount of data for all the logical volumes in descending order of the frequency of access based on the access management information,
determine whether the accumulated total amount of data for all the logical volumes exceeds a predetermined percentage of total capacity of the cache disk,
when the accumulated total amount of data for all the logical volumes is equal to or less than the predetermined percentage of the total data capacity of the cache disk,
set the difference data write mode as a write mode for data transfer of all the logical volumes, and
when the accumulated total amount of data for all the logical volumes exceeds the predetermined percentage of the total storage capacity of the cache disk,
set the difference data write mode as a write mode for data transfer of logical volumes corresponding to a part, among all the logical volumes, in which the amount of data of the logical volumes accumulated in descending order of the frequency of access is equal to or less than the predetermined percentage of the total storage capacity of the cache disk, and
set the entire data write mode as a write mode for data transfer of logical volumes corresponding to a part, among all the logical volumes, in which the amount of data of the logical volumes accumulated in descending order of the frequency of access is exceeding the predetermined percentage of the total data capacity of the cache disk.

6. The storage system according to claim 5, wherein the access management information includes access frequency information concerning frequency of access from the host to each of the logical volumes and data information concerning amount of data for each of the logical volumes,
wherein the controller controls to calculate total amount of data for all the logical volumes on the basis of the amount of data for each of the logical volumes, set a write mode for data transfer of all of the logical volumes to the difference data write mode when the total amount of data is equal to or less than a predetermined value, and set a write mode for data transfer of a logical volume selected on the basis of the access frequency information to the entire data write mode when the total amount of data exceeds the predetermined value.

7. The storage system according to claim 5, wherein the access management information includes access frequency information concerning frequency of access from the host to each of the logical volumes and data information concerning amount of data for each of the logical volumes,
wherein the controller controls to accumulate the amount of data for the logical volumes in descending order of the frequency of access on the basis of the access frequency information before the accumulated amount of data exceeds a predetermined value, and set a write mode for data transfer of logical volumes with the amount of data unused for the accumulation to the entire data write mode.

8. The storage system according to claim 5, wherein, as a result of writing the difference data in the logical volume into a tape mounted on the storage apparatus in the difference data write mode, if the tape is different from a tape into which the latest entirety of data has been written, the controller controls to set the write mode for the logical volume to the entire data write mode.

9. A method for controlling to temporarily store an entirety of data transferred from a host in a cache disk in response to a write request from the host to a target logical volume among a plurality of logical volumes, and store the temporarily stored entirety of data in a storage apparatus in response to data transfer from the target logical volume to a physical volume corresponding to the target logical volume, the plurality of logical volumes being assigned with the cache disk, a plurality of logical volumes corresponding to the plurality of logical volumes being assigned with the storage apparatus, the method comprising:
referring to access management information concerning access from the host to each of the plurality of logical volumes when receiving an entirety of updated data from the host; and
setting a write mode for data transfer from each of the plurality of logical volumes to the corresponding physical volume on the basis of the access management information to one of a difference data write mode in which difference data indicating a difference between the entirety of data stored in the storage apparatus and the entirety of updated data is written into the storage apparatus and an entire data write mode in which the entirety of updated data is written into the storage apparatus, wherein
the access management information includes access frequency information concerning frequency of access from the host to each of the logical volumes and data information concerning amount of data for each of the logical volumes, and
the controller configured to:
accumulate the amount of data for all the logical volumes in descending order of the frequency of access based on the access management information, determine whether the accumulated total amount of data for all the logical volumes exceeds a predetermined percentage of total capacity of the cache disk, when the accumulated total amount of data for all the logical volumes is equal to or less than the predetermined percentage of the total data capacity of the cache disk, set the difference data write mode as a write mode for data transfer of all the logical volumes, and when the accumulated total amount of data for all the logical volumes exceeds the predetermined percentage of the total storage capacity of the cache disk, set the difference data write mode as a write mode for data transfer of logical volumes corresponding to a part, among all the logical volumes, in which the amount of data of the logical volumes accumulated in descending order of the frequency of access is equal to or less than the predetermined percentage of the total storage capacity of the cache disk, and set the entire data write mode as a write mode for data transfer of logical volumes corresponding to a part, among all the logical volumes, in which the amount of data of the logical volumes accumulated in descending order of the frequency of access is exceeding the predetermined percentage of the total data capacity of the cache disk.

10. The storage control apparatus according to claim 1, wherein the access management information includes access frequency information concerning frequency of access from the host to each of the logical volumes and data information concerning amount of data for each of the logical volumes, and wherein the controller:

accumulates, in sequence, an amount of data of the logical volumes in descending order of the frequency of access based on the access management information, determines, in sequence, whether the amount of accumulated data of the logical volumes exceeds a predetermined value, sets the difference data write mode as a write mode for data transfer of the logical volumes whose amount of data has been accumulated when determining that the amount of accumulated data of the logical volumes exceeds the predetermined value, and sets the entire data write mode as a write mode for data transfer of all remaining logical volumes other than the logical volumes set to the difference data write mode.

* * * * *